Patented Apr. 10, 1951

2,548,388

UNITED STATES PATENT OFFICE 2,548,388

WRINKLE FINISHES

Eugene W. Moffett, Milwaukee, Wis., assignor to Pittsburgh Plate Glass Company, Allegheny County, Pa., a corporation of Pennsylvania No Drawing. Application December 4, 1948, Serial No. 63,619

10 Claims. (Cl. 260—22)

The present invention relates to coating compositions or finishes and it has particular relation to so-called wrinkle finishes.

One object of the invention is to provide a wrinkle finish, the drying characteristics of which can be controlled to provide a wrinkle pattern of desired grain.

A second object is to provide a wrinkle finish, the optimum baking cycle of which closely conforms to the time-temperature gradient of conventional apparatus employed in baking such finishes.

A third object is to provide a wrinkle finish, the baking of which can be conducted over a wide range of temperatures.

A fourth object is to provide a wrinkle finish, the characteristics of which, upon baking, are not substantially influenced by time variations between application and baking.

These and other objects will be apparent from consideration of the following specification and the appended claims.

It has heretofore been proposed to provide finishes or coating compositions which, as a result of baking, tend to produce a somewhat roughened or winkled surface texture. These finishes, because of their texture, are known to the industry as wrinkle finishes. Such finishes may be prepared, for example, by embodiment of rapid drying oils, such as tung oil, and drying catalysts into a suitable composition. The conventional compositions have not been found to be entirely satisfactory for various reasons; one such reason being criticalness in the time permissible between the application of the film and baking. Any appreciable delay, before baking, would often result in substantial changes in the surface texture of the baked films. In other instances, the temperature of baking was quite critical, thus requiring exact control of this factor in the baking operation. Also, there was no convenient method of controlling the grain or pattern size in the finishes.

The present invention is based upon the discovery that certain alkyd type resins and, notably, the resin obtained by esterification of carbic anhydride with a glycol such as ethylene glycol, 1,2 dipropylene glycol, 1,2 propylene glycol, alpha or beta butylene glycol or, even better, with diethylene glycol modified by a glyceride oil or glyceride oil acids, are eminently suited for use in wrinkle finishes.

In accordance with the provisions of the invention, a drying oil, such as linseed oil, oiticica oil, tung oil, dehydrated castor oil or the like, or the free acids of a drying oil, is employed as the modifying agent for the alkyd resin. When an oil is used, it is customarily alcoholized with an appropriate amount of glycerine or, in some cases, with a mixture of glycol and glycerine. This alcoholysis, preferably, is conducted by heating the drying oil with the polyalcohol to 375°–425° F. in the presence of a catalyst (e. g. 0.05% litharge) before incorporation of the oil with other constituents. In case oil acids are used, this alcoholysis step is not necessary and all constituents are added simultaneously.

Obviously, the fatty acid esters are much the same, regardless of whether they are obtained by reacting glycerol and a fatty acid, or whether a glyceride oil, such as linseed oil or soya oil, is alcoholized with glycerine to provide a mono- or diglyceride. For purposes of this invention, it is usually desirable that the fatty acid ester be the monoglyceride or, at least, that the monoglyceride predominate.

3,6 - endomethylene tetrahydrophthalic anhydride, known commercially as carbic anhydride, is best prepared by the Diels-Alder type of reaction of maleic anhydride and cyclopentadiene. The product is well known in the art and need not be further discussed.

Where drying oil is employed, it may be present in a proportion of 10 to 13 mols per 5 mols of glycerine. A variation of oil of perhaps 5% to 10% above or below these values is contemplated. The fatty acid glycerides will average about a monoglyceride.

The drying oil or the fatty acids of the oil and glycerine will be so proportioned that the resultant ester product will be 10% to 40% oil modified.

The dihydroxy alcohol, e. g. diethylene glycol, will be so proportioned that the total hydroxyl equivalency will exceed, by 10% to about 25%, the total acid equivalency. The glycerides of fatty acids present, probably as the monoglycerides, will be present in an amount of about .10 to .40 mol per mol of carbic anhydride.

The alkyds may be prepared by either the "fusion" or solvent methods. In the former, no solvents are used and the water formed during the esterification is preferably swept out with an inert gas such as carbon dioxide or nitrogen. The solvent method is preferred. In this procedure, the oil acids and glycerine, or alcoholized oil, diethylene glycol and carbic anhydride are mixed with 5% to 10% of their total weight of a suitable inert solvent, such as toluene or xylene. The ratios of components per mol of carbic anhydride, in a series of typical formulations, are tabulated as follows:

TABLE I

| Oil | Mols Oil | Mols Glycerin | Mols Diethylene Glycol | Acid No. | Body |
|---|---|---|---|---|---|
| 1. Linseed oil | .05 | 0.12 | 1.04 | 18 | V |
| 2. Oiticica oil | .05 | 0.12 | 1.13 | 14 | H |
| 3. Linseed oil extract [1] | .05 | 0.15 | 1.04 | 9 | K |
| 4. Dehydrated castor acids | .15 | 0.15 | 1.09 | 14 | T |
| 5. Linseed acids extract | .15 | 0.15 | 0.94 | 20 | I |
| 6. Linseed oil | .10 | 0.24 | 0.87 | | |

[1] Linseed oil extract is a concentrate of highly unsaturated components of linseed oil, obtained by extracting linseed oil with furfural and expelling the furfural from the extract phase.

In the table, the excess hydroxyl equivalency, in each instance, amounts to approximately 20%. This will be apparent from the following examples, which are based upon items 1 and 6 of the above table.

*Example A*

| Component | Mols Present | Equivalents Acid | OH |
|---|---|---|---|
| Linseed oil | .05 | 0.15 | 0.15 |
| Glycerine | .12 | | 0.36 |
| Diethylene Glycol | 1.04 | | 2.08 |
| Carbic anhydride | 1.00 | 2.00 | |
| Total | | 2.15 | 2.59 |

Excess OH over acid, 20%.

The following illustrates the effect of lengthening the oil modification.

*Example B*

| Component | Mols Present | Equivalents Acid | OH |
|---|---|---|---|
| Linseed oil | .10 | 0.30 | 0.30 |
| Glycerine | .24 | | 0.72 |
| Diethylene Glycol | 0.87 | | 1.74 |
| Carbic anhydride | 1.00 | 2.00 | |
| Total | | 2.30 | 2.76 |

In the examples of the table, the diethylene glycol may be replaced by the other glycols herein enumerated.

The resins are approximately 15% oil modified. This ratio may vary from approximately 10% to 40%. The reaction of these ingredients to form a desired resin may be conducted at an appropriate temperature, e. g. about 350° to 425° or 450° F. The reaction should be continued until desired viscosity and acid value are reached. Preferably, the acid value will be within an approximate range of 10-30, as determined by titration in conventional manner. The "body" of the resin, indicated in the last column of the foregoing table, is expressed in conventional Gardner-Holdt units, and was determined upon a mixture consisting of approximately 60% solids dissolved in toluene. Usually, the reaction will be sufficiently complete within a period of 16-20 hours.

The resins so obtained can be dissolved in various inert solvents and, notably, in relatively inexpensive hydrocarbon solvents, such as toluene or xylene, or in monoethyl ether of ethylene glycol, ethyl or methyl ketone or the like, taken singly or in various combinations, to obtain desired evaporation characteristics in accordance with conventional practice in formulating coating compositions. The proportion of solvents depends upon the viscosity desired in the solution which, in turn, will depend upon the mode of application employed in the coating operations. Assuming that the solution is to be applied by spraying, the solvents will be added to, in such ratio as to admit ready and economic application by a spray gun. Usually, it is desirable to maintain as high a ratio of solids to volatile solvent as is consistent with the mode of application, thus assuring maximum film thickness with minimum number of applications. Other compounding ingredients and modifiers, such as pigments like carbon black, Prussian blue, fine magnesium silicate, and driers such as cobaltic compounds like cobalt naphthenate or resinate, should be included. By increasing the ratio of inert pigment, the size of the wrinkle pattern can be reduced at will.

The following are typical enamel formulations, formula A giving a relatively coarse wrinkle pattern, and formula B giving a very fine pattern:

| | Formula A | Formula B |
|---|---|---|
| Resin | 57 | 57 |
| Paste | 14.7 | 14.7 |
| A monoethyl ether of ethylene glycol | 7.5 | 7.5 |
| Toluene | 20 | 20 |
| Methyl ethyl ketone | 6.4 | 6.4 |
| Magnesium silicate | | 10 |
| Drier (solution of cobalt naphthenate containing 3% Co) cc | 3 | 3 |

The composition of the resin is given in the 5th item in Table I and it was thinned in toluene to 60% solids. The composition of the paste follows:

Grams
Linseed oil modified carbic glycol ester_____ 300
(60% solids in toluene)
Carbon black pigment _____ 30
A monoethyl ether of ethylene glycol_____ 110

The mixture was ball milled to disperse thoroughly the pigment.

The solutions may be applied to wood or to metal such as iron or steel. The baking operation may be delayed a substantial period of time after application of the coatings, and such time interval need not be uniform since it is one advantage of the material that a time interval between application and baking may vary, from two or three minutes to a half hour or more, without appreciably affecting the texture of the baked finishes. The baking operation may be successfully completed by subjecting the finishes to temperatures, for example, 350° to 400° F. for a period of approximately 30 minutes. It is also permissible to conduct the baking operation at a temperature of about 200° to 250° F. for a period of 5 to 15 minutes and then, gradually, to raise the temperature to a final value of 350° to 400° F. Likewise, compositions may be baked at about 300° F. for 45 minutes.

After baking, the finishes are hard and adherent. They are wrinkled in appropriate texture or pattern, which can be varied at will by increasing or decreasing the amount of inert pigment in the finish. Usually, the pigment will constitute about 5 to 30 percent of the solids content of the mixture, but may be greater for very fine grained finishes and less for coarser grained finishes.

The embodiments of the invention herein described are to be regarded merely as by way of example. Numerous modifications can be made therein without departing from the spirit of the invention or the scope of the claims.

This application is a continuation-in-part of my co-pending application Serial No. 586,033, filed March 3, 1945, and now abandoned.

I claim:

1. In a method of preparing a wrinkle finish, the steps of preparing a mixture of (A) 1 mol of carbic anhydride, (B) a material of a class consisting of (1) a mixture of glycerine and drying oil fatty acids in equal molar ratio and (2) a drying oil alcoholized with glycerine, the drying oil being in a proportion of 5 mols to 10 to 13 mols of glycerine, the material of said class being present in an amount equivalent to .10 to .40 mole of monoglyceride of drying oil acids per mole of carbic anhydride, and (C) diethylene glycol in such quantity as to provide a 10 to 25% excess of hydroxyls over carboxyls and heating the mixture to a temperature of 350° to 425° F. for a period of 16 to 20 hours.

2. The product as obtained by the method defined in claim 1.

3. In a method of preparing a wrinkle finish, the steps of esterifying a mixture of (A) 1 mol of carbic anhydride with (B) .10 to .40 mole of a monoglyceride of an acid of a drying glyceride oil and (C) diethylene glycol, the diethylene glycol and monoglyceride being present in an amount to provide a 10 to 25% excess of hydroxyls over carboxyls, said esterification being effected by heating the mixture to a temperature of 350° to 450° F. for 16 to 20 hours.

4. A process as defined in claim 3, in which the the monoglycerides are of linseed oil acids.

5. In a method of forming a wrinkle finish, the step of heating to a temperature of 350° to 425° F., a mixture of 1 mol carbic anhydride, .10 to .40 mol of a monoglyceride of a drying glyceride oil acid, and a glycol which is the dihydroxy ether obtained by condensing two molecules of a dihydroxy alkane containing 2 to 3 carbon atoms to form 1 molecule of said ether, the dihydroxy ether being employed in an amount to provide a 10 to 25% excess of hydroxyls over carboxyls and discontinuing heating when an acid value of 10 to 30 is obtained.

6. A product as obtained by the steps defined in claim 5.

7. The steps as defined in claim 5, in which the glycol is diethylene glycol.

8. As a new wrinkle finish material, the benzene and toluene soluble alkyd resin, which is the polyester of 1 mole of carbic anhydride, .10 to .40 mole of a monoglyceride of a drying oil acid, and diethylene glycol in an amount to provide a 10 to 25% excess of hydroxyls over carboxyls, said material being of an acid value of 10 to 30.

9. The step as defined in claim 5 in which the glycol is of a class consisting of diethylene glycol and 1-2 dipropylene glycol.

10. As a new wrinkle finish material, the benzene and toluene soluble alkyd resin which is the polyester of 1 mole of carbic anhydride, .10 to .40 mole of a monoglyceride of a drying oil acid and 1-2 dipropylene glycol in an amount to provide a 10 to 25% excess of hydroxyls over carboxyls, said material being of an acid value of 10 to 30.

EUGENE W. MOFFETT.

REFERENCES CITED

The following references are of record in the file of this patent:

UNITED STATES PATENTS

| Number | Name | Date |
|---|---|---|
| 2,343,997 | Powell et al. | Nov. 14, 1944 |
| 2,452,992 | Butler | Nov. 2, 1948 |